May 30, 1933. F. H. OWENS 1,912,157
MEANS AND METHOD FOR RECORDING AND REPRODUCING PHOTOGRAPHIC SOUND RECORDS
Filed Sept. 17, 1928

INVENTOR.
FREEMAN H. OWENS.
BY
John D. Brady
ATTORNEY

Patented May 30, 1933

1,912,157

UNITED STATES PATENT OFFICE

FREEMAN H. OWENS, OF NEW YORK, N. Y.

MEANS AND METHOD FOR RECORDING AND REPRODUCING PHOTOGRAPHIC SOUND RECORDS

Application filed September 17, 1928. Serial No. 306,491.

My invention relates generally to a means and method for recording and reproducing photographic sound records, and has for its primary object the elimination of the necessity of moving the photographic film past and in contact with a mechanical or optical slit device as has been the case in the past, in recording and reproducing sound photographically, thus eliminating the scratching of the photographic film in its movement past the slit and the likelihood of filling up the slit with particles from the film.

Other objects and advantages in details will be apparent as the description proceeds, reference now being had to the figures of the accompanying drawing wherein like reference numerals indicate like parts.

In the drawing:—

Figure 1:
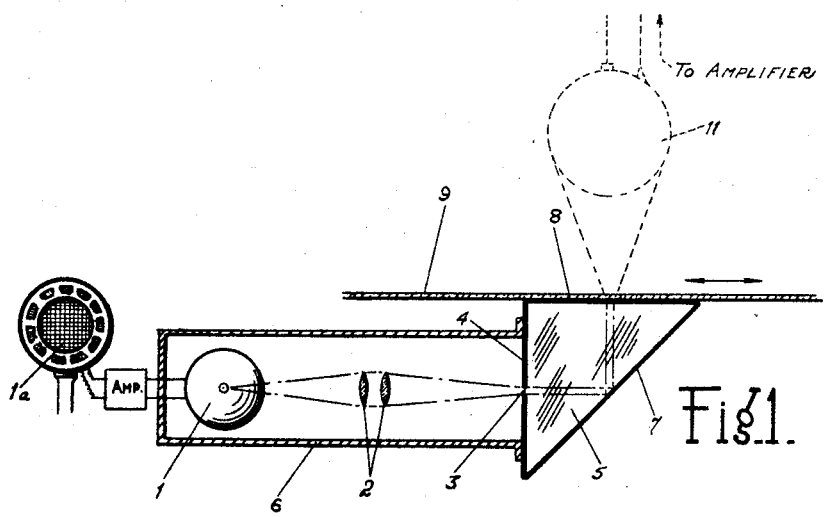
Figure 1 is a diagrammatic plan view illustrating my invention.
Figure 2:
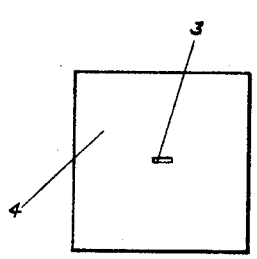
Figure 2 is a detail plan view of the masked surface of the prism used in my invention.
Figure 3:
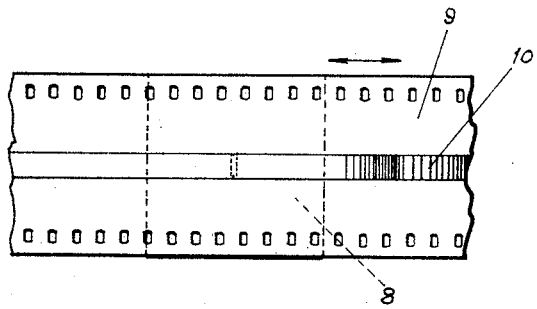
Figure 3 is a detail plan view illustrating the relation of the photographic film to another surface of said prism for recording the sound record on said film.

I have illustrated my invention in full lines as a recording unit and have indicated in dotted lines how the same may be readily modified to adapt the invention to reproducing.

In carrying out my invention, I provide a light source such as the lamp 1, the light rays from which pass through condenser lenses 2 and are focused upon a masked slit 3 located on one surface 4 of a prism 5.

This lamp 1 may be any suitable and accepted or proven form of recording lamp, the intensity of which is modulated by converted sound waves from a microphone or other sound source indicated at 1a.

As indicated in Figure 1, this surface 4 is provided with a suitable mask, as for instance by painting the surface, which completely covers the same except for the narrow slit 3. A suitable casing 6 may be provided to house the lamp 1 and lenses 2 and to confine the light to the surface 4 of the prism and the slit 3.

The light entering the slit 3 passes in parallel rays to the angular reflecting surface 7 of the prism from which they are reflected at right angles to the surface 8 of the prism located at right angles to the surface 4. The photographic film 9 is adapted to be moved by any suitable film moving mechanism past the surface 8 of the prism and preferably in contact therewith and to receive the parallel light rays reflected from the slit 3, whereby the photographic sound record 10 is recorded thereon. It is not essential, however, that the film should be moved in actual contact with the surface of the prism, since satisfactory results may be obtained if a very slight air gap exists between the prism surface and the film.

Inasmuch as the prism 5 passes and reflects the light rays entering through the slit 3 in parallel relation, the surface 8 of the prism against which the film 9 moves, can be perfectly smooth and polished thus eliminating the likelihood of scratching the film, and as a result an accurate photographic reproduction of the modulated light rays from the lamp 1 is produced upon the film 9.

One advantage to be had with the perpendicularly disposed surfaces of the prism and the diagonally disposed reflecting surface thereof is that the optical system of my invention can be very compactly disposed within the limited confines of a motion picture camera, thus obviating the necessity for redesigning and enlarging the casing for such a camera.

By slight modification, this invention is readily adaptable for the reproducing of photographic sound records. In such event, it is understood, of course, that the lamp 1 or source of light will emit light rays of constant intensity. Such rays after passing through the sound record 10 on the film 9, and of course modulated thereby, fall upon a photo electric cell 11 where such modulated light rays are converted into electric impulses. This photo electric cell is of course provided with connections to a suitable amplifier and loud speaker device whereby the photographic sound record 10 may be reproduced as sound.

Of course, changes may be made by way of detail without departing from the spirit and scope of my invention. I do not limit myself, therefore, to the exact form herein shown and described other than by the appended claims.

I claim:—

1. Means for recording sound on photographic film comprising a source of sound modulated light, means for directing said modulated light to a masked slit on one surface of a prism and a sensitized film movable past and in contact with another surface of said prism for receiving the reflected light from said slit.

2. In combination, means for converting sound into electric impulses, means for converting said electric impulses into variations in light, means for directing said light upon a slit, a sensitized film movable in a plane at an angle to the plane of said slit, and means comprising a prism in contact with said slit and said film whereby light from said slit is reflected to said film.

3. In combination, a source of modulated light, a prism provided with a slit through which a portion of said modulated light passes, and a sensitized film movable in a plane at an angle to the plane of said slit, said prism providing a reflecting surface intermediate said slit and said film, whereby light from said slit is reflected to said film.

4. Means for recording light modulations comprising a source of modulated light, a prism having a masked slit on one surface thereof, and a sensitized film movable past and in contact with another surface thereof, whereby the portion of said light passing through said slit is reflected by said prism and received on said film.

5. Means for recording light modulations comprising a source of modulated light, a right-angled triangular prism having a masked slit on one surface thereof, and a sensitized film movable past and in contact with another surface thereof, said slit and film being disposed in perpendicular planes, whereby the portion of said light passing through said slit is reflected by said prism and received on said film.

6. A reflecting prism having a masked slit closely adjacent a light-penetrative surface thereof and a photographic film movable closely adjacent a light-emissive surface of said prism, the two said surfaces being substantially perpendicular to one another.

7. A reflecting prism having a surface thereof rendered substantially opaque to light except for a light-penetrative portion defining a slit and a photographic film movable in close relation to a light-emissive surface of said prism, the two said surfaces being substantially perpendicular to one another.

8. In a device of the class described, a prismatic reflector one surface of which is closely adjacent a mask having a light slit and another surface of which is substantially perpendicular to the first said surface, means to project a beam of light through said slit and outwardly from the reflecting surface of said prismatic reflector through the second said surface thereof, light modulating means to vary the intensity of said beam in accordance with sound vibrations and a film sensitive to said light modulating means, said film being movable past and closely adjacent the second said surface of said prismatic reflector.

9. In a device of the class described, a prismatic reflector one surface of which is closely adjacent a mask having a light slit and another surface of which is substantially perpendicular to the first said surface, means to project a beam of light through said slit and outwardly from the reflecting surface of said prismatic reflector through the second said surface thereof, a film movable past and closely adjacent the second said surface and a photoelectric cell upon which said beam of light may be caused to impinge after projection through said film.

In testimony whereof, I affix my signature.

FREEMAN H. OWENS.